Figure 1:
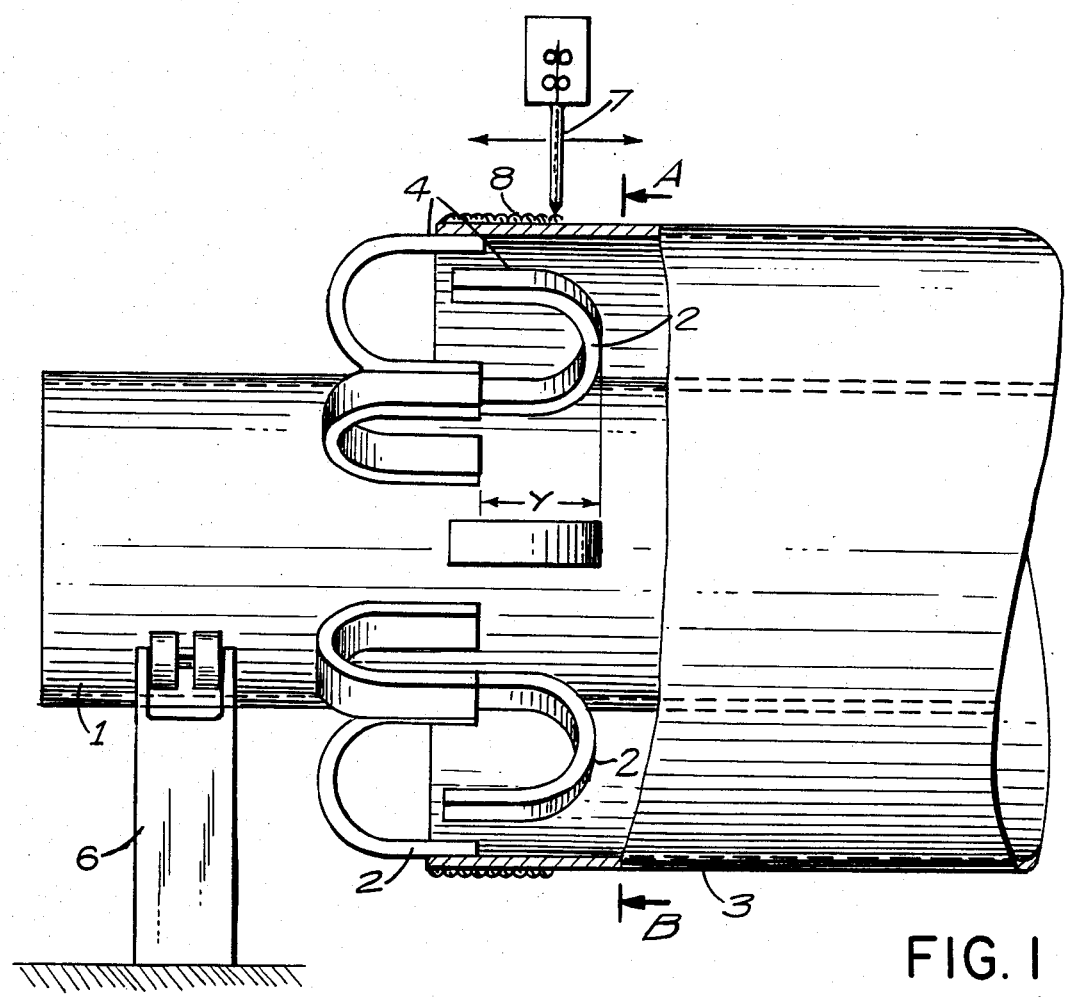

United States Patent [19]

Fernandez et al.

[11] Patent Number: 4,479,602

[45] Date of Patent: Oct. 30, 1984

[54] APPARATUS FOR THE MANUFACTURE OF HOLLOW CYLINDRICAL BODIES

[75] Inventors: José Fernandez; Jürgen Herm; Heinz Krakow; Harald Tomsen, all of Hamburg, Fed. Rep. of Germany; Ernst Wortmann, deceased, late of Hamburg, Fed. Rep. of Germany, by Elfriede Wortmann, legal representative

[73] Assignee: Thyssen Stahl Aktiengesellschaft, Duesseldorf, Fed. Rep. of Germany

[21] Appl. No.: 289,848

[22] Filed: Aug. 4, 1981

[30] Foreign Application Priority Data

Aug. 6, 1980 [DE] Fed. Rep. of Germany ....... 3029686

[51] Int. Cl.$^3$ .......................... B23K 9/04; B23K 37/04
[52] U.S. Cl. .................................... 228/48; 219/159; 228/212; 285/138; 279/2 R; 269/50
[58] Field of Search .................... 29/126; 228/48, 212, 228/213; 51/227 R; 269/50; 285/133 R, 134, 138; 279/2 R; 219/76.1, 76.14, 159, 160

[56] References Cited

U.S. PATENT DOCUMENTS

| 2,154,343 | 4/1939 | McDermott | 29/126 X |
| 2,262,325 | 11/1941 | Kendall | 29/126 X |
| 2,750,911 | 6/1956 | Baker et al. | 269/50 X |
| 3,895,789 | 7/1975 | Mengeringhausen et al. | 269/50 X |
| 4,201,326 | 5/1980 | Connell | 219/160 X |

Primary Examiner—Z. R. Bilinsky
Attorney, Agent, or Firm—Sprung, Horn, Kramer & Woods

[57] ABSTRACT

The disclosure relates to an apparatus for the manufacture of hollow cylindrical bodies by deposit welding, consisting of a supporting body rotatably mounted on bearings at both ends and a hollow cylindrical basic body concentric to the supporting body being supported by said supporting body means of circumferentially arranged radially spacing members. According to the disclosure the spacing members are elastically flexible.

3 Claims, 2 Drawing Figures

APPARATUS FOR THE MANUFACTURE OF HOLLOW CYLINDRICAL BODIES

The invention relates to an apparatus for manufacture of hollow cylindrical bodies by deposit welding, consisting of a supporting body rotatably mounted on bearings at both ends and a hollow cylindrical basic body concentric to the supporting body being supported by said supporting body by means of circumferentially arranged radially extending spacing members.

An apparatus of this kind with an adjustable linkage between supporting body and basic body eg. by means of spindles, being useful for basic bodies having different diameters is known from German Auslegeschrift No. 28 50 721.

It is an object of the invention to achieve a steady absorption of contraction strain occuring during the manufacture of large, heavy bodies by arc deposit welding, in order to keep the geometry of the basic body unchanged, i.e. no change in the circular form and no alteration in the diameter over the length of the basic body should occur. The linkage between supporting body and basic body therefore should be arranged in such a way that neither denting nor bending of the basic body occurs as a result of the contraction strain caused by the deposit welding.

According to the present invention, in an apparatus of the type described above the spacing members are elastically flexible. It is hereby ensured that the geometry of the basic body is not changed by the forces which result from the contraction strain exerted on the basic body during deposit welding. The elastically flexible spacing members absorb these forces by changing their own form.

According to a further improvement of the invention, the spacing members consist of U-shaped spring elements being mounted so that their legs running parallel to the axis of the basic body, and are arranged and fixed in the ring-shaped space between supporting body and basic body at suitable distances from each other in radial and axial directions. Such spacing members, preferably of flat or round steel bar are more reasonably priced than the known spacing means.

The U-shaped spring elements can be arranged with their open end alternately to the end or to the middle of the supporting body. Thereby through the alternate arrangement of the spring elements, the basic body is evenly supported over a relatively wide area. The spring elements are mounted at both ends of the basic body. They can also be fitted at one or more points over the length of the basic body. This is particular advantageous in the case of very long basic bodies.

The invention is illustrated with the aid of the accompanying drawings.

FIG. 1 shows an end section of the apparatus in partial section, and

Figure 2:
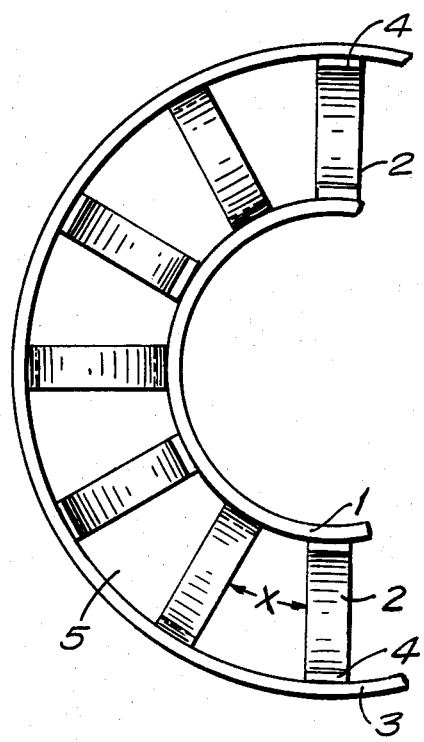

FIG. 2 half of a section along the line A—B in FIG. 1.

On the hollow cylindrical supporting body 1, U-shaped spring elements 2 with one of their legs 4 at distances x circumferentially are fixed e.g. by spot welding. With the other leg 4, the U-shaped spring elements 2 are in contact with the inner peripheral surface of the hollow cylindrical basic body 3 thereby bridging the ring-space 5 between the supporting body 1 and the basic body 3, and can also be welded onto the latter. The U-shaped spring elements 2 can be arranged at distance y in axial direction, thus supporting the basic body 3 over greater length.

As FIG. 1 in particular shows, the U-shaped spring elements 2 have the opening between their legs 4 alternately towards the end or the middle respectively of the supporting body 1, resulting in a greater stability of the linkage.

At the end the supporting body 1 is mounted rotatably on bearings, e.g. on supporting roller bearings, for rotation of the basic body 3 together with the supporting body 1 during deposit welding using a stationary deposit welding device 7 shown schematically in FIG. 1 for successively depositing welding material 8 layerwise onto the surface of the basic body, the wall thickness of which thereby increasing to the desired value.

We claim:

1. An apparatus for the manufacture of hollow cylindrical bodies by deposit welding comprising a supporting body rotatably mounted on bearings at both ends thereof, a plurality of circumferentially and radially extending U-shaped spring elements periphery of said supporting body, the legs of which elements are parallel to the axis of the supporting body, said U-shaped spring elements being adaptable to engage a hollow cylindrical basic body concentrically disposed to said supporting body, said apparatus further including a welding means positioned relative to said supporting body to deposit welding material on the outer surface of any hollow cylindrical basic body engaged by said U-shaped spring elements.

2. Apparatus according to claim 1, characterized in that the U-shaped spring elements are arranged with their open end alternately towards the middle or the end respectively of the supporting body.

3. Apparatus according to claim 1 or 2, characterized in that the U-shaped spring elements are fastened onto the supporting body by spot welding.

* * * * *

UNITED STATES PATENT AND TRADEMARK OFFICE
CERTIFICATE OF CORRECTION

PATENT NO. : 4,479,602

DATED : October 30, 1984

INVENTOR(S) : Jose Fernandez et al

It is certified that error appears in the above-identified patent and that said Letters Patent is hereby corrected as shown below:

Col. 2, line 16  Delete "distance" and substitute --distances--

Col. 2, line 36  After "spring elements" insert --mounted on the outer--

Signed and Sealed this

Thirtieth Day of April 1985

[SEAL]

Attest:

DONALD J. QUIGG

*Attesting Officer*  *Acting Commissioner of Patents and Trademarks*